United States Patent [19]

Roenisch et al.

[11] Patent Number: 4,458,105

[45] Date of Patent: Jul. 3, 1984

[54] CABLE PROTECTED AGAINST MOISTURE AND METHOD OF MAKING THE SAME

[75] Inventors: Wolfgang Roenisch, Mellendorf; Joachim Klass, Stadthagen; Hermann-Uwe Voigt, Hannover; Ferdinand Hanisch, Burgwedel; Cornelius van Hove, Langenhagen; Horst Matzat, Garbsen; all of Fed. Rep. of Germany

[73] Assignee: Kabelmetal Electro GmbH, Hanover, Fed. Rep. of Germany

[21] Appl. No.: 127,493

[22] Filed: Mar. 5, 1980

[30] Foreign Application Priority Data

| Mar. 5, 1979 | [DE] | Fed. Rep. of Germany | 2908454 |
| Sep. 27, 1979 | [DE] | Fed. Rep. of Germany | 2939100 |
| Dec. 4, 1979 | [DE] | Fed. Rep. of Germany | 2948651 |
| Dec. 4, 1979 | [DE] | Fed. Rep. of Germany | 2948718 |

[51] Int. Cl.$^3$ .................. H01B 7/28; H01B 13/22
[52] U.S. Cl. .................. 174/106 D; 29/241; 156/56; 174/23 R
[58] Field of Search ............ 174/106 D, 102 D, 23 R, 174/111; 156/56; 29/433, 241

[56] References Cited

U.S. PATENT DOCUMENTS

| 382,767 | 5/1888 | Patterson | 174/23 R |
| 452,725 | 5/1891 | Williams | 174/111 X |
| 2,045,884 | 6/1936 | Sundback | 29/241 |
| 4,083,484 | 4/1978 | Polizzano | 174/106 D |
| 4,225,749 | 9/1980 | Pierre | 174/106 D |

FOREIGN PATENT DOCUMENTS

| 3291 | of 1892 | United Kingdom | 174/111 |
| 1523433 | 8/1978 | United Kingdom | 174/23 R |

Primary Examiner—J. V. Truhe
Assistant Examiner—Morris H. Nimmo
Attorney, Agent, or Firm—Ralf H. Siegemund

[57] ABSTRACT

A cable core, comprising conductors with insulation and carrying a conductive shield layer is protected and shielded by a corrugated metal tube cooperating either with individual, electrically conductive sealing rings, or a conductive helical sealing ribbon with foam filling any gaps. The construction ensures adequate space for thermal expansion of the insulation without undue tensioning of the tube. A method of making the assembly is described and examples for the ribbon and the foam are given.

12 Claims, 7 Drawing Figures

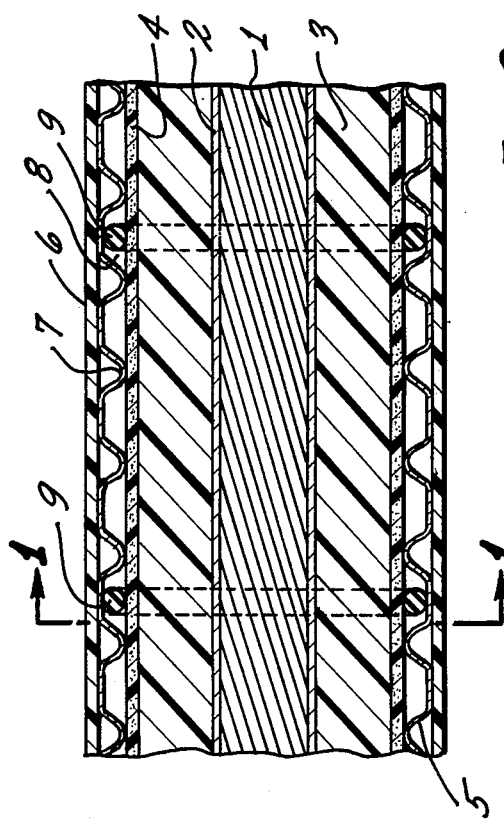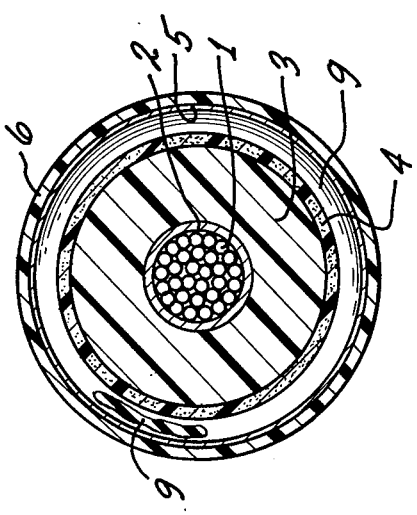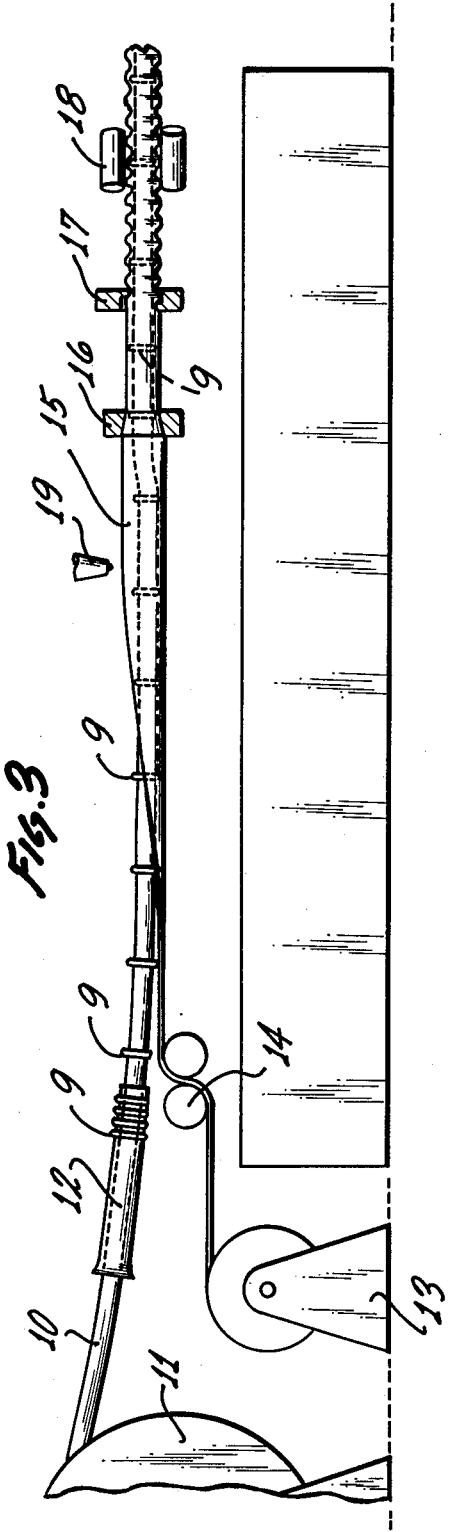

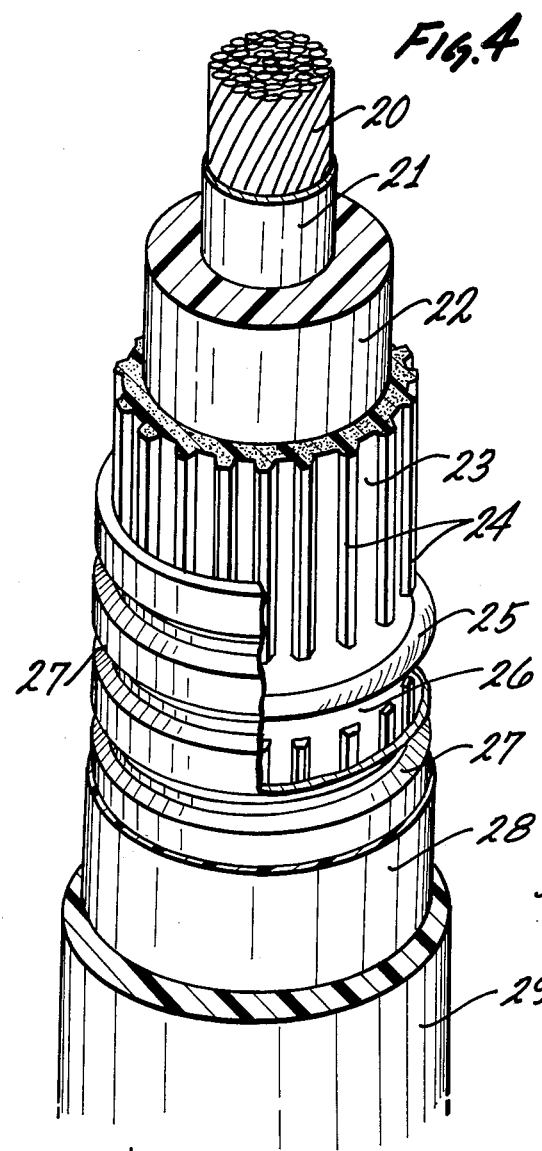
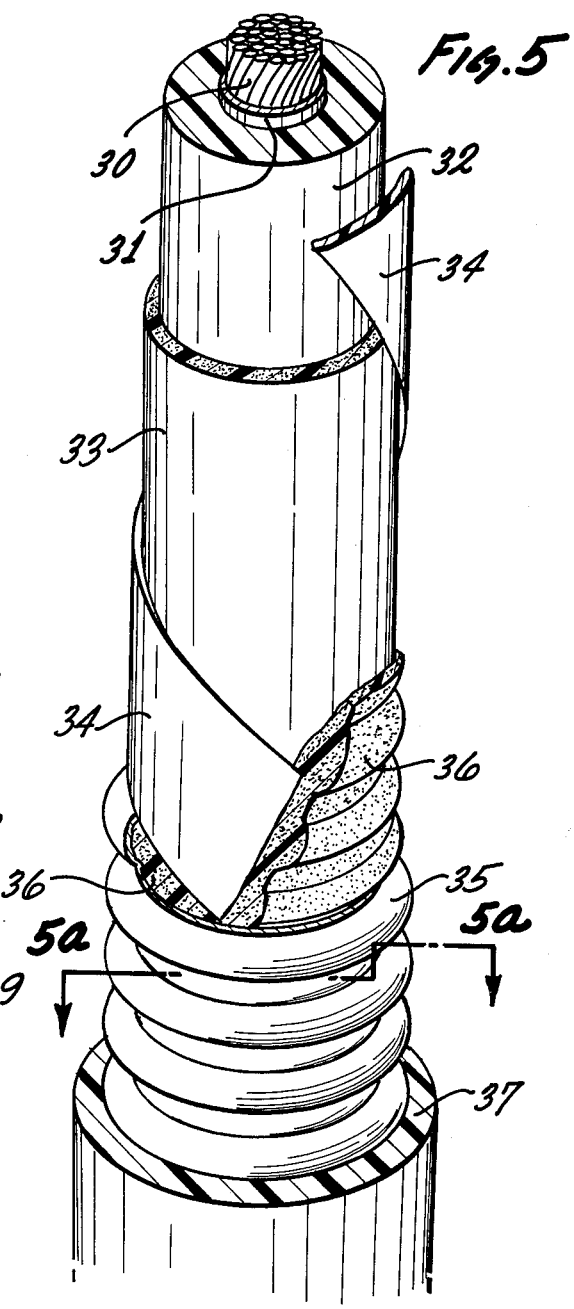
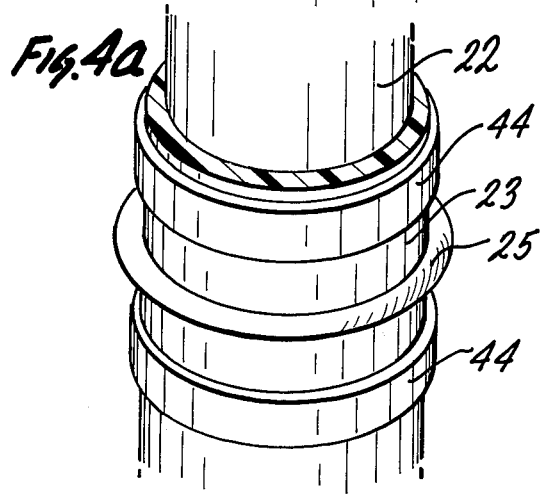
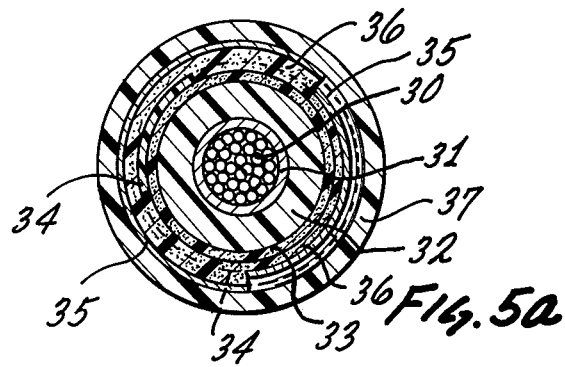

CABLE PROTECTED AGAINST MOISTURE AND METHOD OF MAKING THE SAME

BACKGROUND OF THE INVENTION

The present invention relates to a power cable being electrically insulated by means of a synthetic material and being protected against the ingress of moisture.

High-power cables, particularly of the variety used for transmitting high voltages, are usually constructed in a multilayer configuration. The conductive core is covered or enveloped by a relatively thick insulation being, in turn, covered in some fashion by a shield. The shield is, for example, constituted by wires, or the like, embedded in a sealer serving as a barrier against ingress moisture (see, for example, German patent application No. 25,14,891); or a tube is used as a shield, constituting also a barrier against moisture (U.S. Pat. No. 3,943,271 or German patent application No. 15,40,430). This barrier shield is constructed from longitudinally folded strip, being lap-soldered or welded.

The known high-power cables of any type and construction, as described, are disadvantaged by the fact that, upon loading the cable, its insulation undergoes a different (usually much larger) thermal expansion than the enveloping metal shield structure. Soon the welding or soldering seam will break. Such local rupture does not immediately affect the cable performance, but moisture will penetrate, migrate longitudinally, e.g., underneath the metal envelope, and the thermal expansion of the insulation is actually gradually increased by that moisture. Hence, the "working" of the expanding insulation against the metal envelope is reenforced so that sooner or later the entire cable is destroyed.

Communication cables have been constructed to include swelling agents who swell when moist and, hopefully, plug a ruptured envelope. One has tried to use this technique in power cable, but unsuccessfully so. In particular, the introduction of swellable powder and the relatively large quantities needed have proven troublesome.

DESCRIPTION OF THE INVENTION

It is an object of the present invention to improve power cable with regard to protection of its insulation against moisture and to prevent, in particular, the longitudinal migration of moisture inside the cable.

It is a specific object of the present invention to protect a cable, having a closed metallic, tubular shield as barrier against ingress of moisture, against rupture of that barrier due to thermal expansion or, at least, against axial migration of moisture due to a local rupture point.

It is a feature of the present invention to use such a tubular barrier as per the specific object but with annular or helical corrugation.

In accordance with the preferred embodiment of the present invention, the corrugated tube is either directly seated on a conductive layer of a cable core, the core being comprised of at least one conductor, an insulation jacket and the conductive layer, or a rubber-elastic, electrically conductive helix is interposed between the core and the corrugated tube. In either case, additional sealing is provided for, either by means of rubber elastic, preferably electrically-conductive, rings, or by means of foam, preferably semirigid foam, provided particularly to fill space between the corrugation ridges of the metal shield and between loops of the rubber-elastic ribbon spacer. In either case, rubber elastic means are included in the space between the core (particularly the conductive layer thereon) and the corrugated tubular barrier.

A cable having basically a construction as outlined above is much less likely to rupture on account of the corrugation of the tubular barrier. Should the barrier rupture, axial migration of the moisture is prevented by the sealing rings or the foam. In the case of a rubber elastic helix, the configuration is actually even less likely to rupture as the insulation jacket and the core has many portions not being in direct contact with the metal tube.

It is pointed out that the metal tube is not embedded in material which could work against the seam of the tube on thermal expansion. The tube is in contact either with a rubber elastic element and/or with foam. As far as the core on one hand and the metal tube on the other hand is concerned, there is always air (foam) space available for yielding.

The metal tube should make good electric contact with the conductive layer on top of the cable core insulation. Forcing the corrugation ridges against the layer during the making of the corrugation is one way. Additionally, the rubber elastic rings should also be electrically conductive. In case of the helical spacer ribbon, contact must be provided through that ribbon which should have a conduction in excess of $10^{-4} \Omega^{-1} cm^{-1}$. It is important to note that this ribbon, when used, is not comparable with a copper tape holding conductors in a bundle. The present ribbon combines conductive with elastic function.

In the preferred form, acrylonitrilebutadiene rubber rings or thermoplastic rubber rings should be used, having been made conductive through the addition of carbon black or graphite and, preferably, being cross-linked for mechanical and thermal strength enhancement. A shore hardness of 40 to 80, preferably 60 to 70, is envisioned. The rubber elastic ribbon is preferably made from ethylene propylene rubber or chlorinated polyethylene, again under the addition of carbon black and/or graphite.

The foam is preferably made on a polyurethane basis having an in situ density between 100-to-300 kg/m$^3$, preferably 150-to-250 kg/m$^3$, and between 50% to 80% of its pores or cells should be closed. The foam should result from bringing together two components, one being preferably diphenyl methane diisocyanate, the other one being a blend of a blowing agent, e.g., water, a catalyst and the reaction product (polyol) of ethylenoxide and/or propylenoxide, and a component having at least two or three active hydrogen atoms such as trimethylolpropane, glycerin, ethylenediamin, and others. The polyol is to have a molecular weight of 3000 to 6000. The components must be metered so that foaming is delayed until the tube is closed but still rising and flowing through and lodging adequately in the several gaps between tube corrugation and core. The tube is made by longitudinally folding a metal strip around the core.

The corrugation of the tube should be sized afterwards by flattening the outwardly extending ridges being, for example, the grooves in which sealing rings lodge.

The sealing rings should be amenable to some limited, axial movement on the core so that they will readily lodge in a groove of the corrugation, once made. On the other hand, stops should be provided to limit axial displacement of the rings during the folding of metal strip pursuant to making and forming the tube around the core and the rings thereon. The stops may be provided by interrupted, longitudinal ridges or by means of bands.

DESCRIPTION OF THE DRAWINGS

While the specification concludes with claims, particularly pointing out and distinctly claiming the subject matter which is regarded as the invention, it is believed that the invention, the objects and features of the invention, and further objects, features, and advantages thereof, will be better understood from the following description taken in connection with the accompanying drawings, in which:

FIG. 1 is a cross section through a cable in accordance with the preferred embodiment of the present invention, the section being indicated by line 1—1 in FIG. 2;

FIG. 2 is a longitudinal section through the cable shown in FIG. 1;

FIG. 3 is a schematic view of assembling the cable as shown in FIGS. 1 and 2; but the figure is also useful in understanding the assembly of cables as per FIGS. 4 and 5;

FIG. 4 is a perspective section view, with peeled and cut-away layers, of another cable in accordance with the preferred embodiment;

FIG. 4a is a modification of a portion of the cable as shown in FIG. 4;

FIG. 5 is a view similar to FIG. 4, but showing a modification still constituting an example of the preferred embodiment of the invention; and FIG. 5a is a cross section through the cable shown in FIG. 5.

Proceeding now to the detailed description of the drawings, FIGS. 1 and 2 illustrate a high-voltage cable having a conductor constructed from many stranded wires or leads 1 and being enveloped by a conductive smoothing layer 2. This layer 2 prevents the generation of excessively high, local electric field strength which may result from large curvatures and larger changes in the curvature of the outer contour of a stranded bundle of wires. The smoothing layer 2 has been, e.g., extruded onto and around the stranded wires and may be comprised of polyethylene or one of its copolymers made electrically conductive by the addition of carbon black, or the like.

The core is covered by an insulation jacket 3 made of a cross-linked polymer or a polymer without cross-linking. Preferably, one will use polyethylene or ethylene-propylene rubber. The jacket 3 is covered by an outer conductive layer 4; jacket 3 and layer 4 have been made by extrusion; and particularly layer 4 is also a thermoplastic polymer made conductive through a suitable additive (carbon black, graphite, etc.).

An outer shield and barrier against moisture is provided by a metallic, corrugated jacket 5 which is established by folding longitudinally and seam-welding a copper strip, an aluminum strip, or a strip of nonmagnetic steel. Jacket or tube 5 serves as an electrical shield as well as a barrier against moisture. The tube is in good electric contact with layer 4 of the cable core, and tube 5 is tightly sealed. The corrugation of the tube establishes radial resiliency so that thermal expansion of the core can be taken up. Also, the corrugation facilitates reeling the cable, winding it on, and unwinding it from the drum.

An outer jacket 6, also being made of a synthetic material (preferably, polyvinyl chloride) covers the shield 5. Depending upon the field of use, particularly the conditions at the installation site, it may be advisable to provide a corrosion-proofing layer underneath jacket 6, made e.g. of a bituminous substance. Also, an armoring may be provided on top of jacket 6.

In order to prevent migration of moisture underneath shield and jacket 5, the corrugations of that tube should be annular; i.e., they should have a closed-loop configuration rather than a helical one. Accordingly, the corrugation pattern is axially the same, peaks 7 alternate with valleys or grooves 8 (as seen from the inside) without a "phase shift". The grooves 8, of course, are radially, outwardly extending ridges. In addition, some of the grooves 8 contain rubber-elastic sealing rings 9. These rings may include additives so that they swell when absorbing moisture.

It can, thus be seen that particularly rings 9 provide a series of bulkhead-like barriers, preventing moisture from migrating in longitudinal direction. The rings exert a slight compressive force upon the layer underneath (4 and 3) to avoid any creepage of water.

The spacing between these rings 9 depends on the use of the cable and the environment, and the ambient conditions of such use; that is to say, the probability of severe cable damage and the probability of extensive moisture ingress are aspects to be considered in chosing the ring spacing. In practice, one may need a spacing of not closer than two meters; but a maximum spacing of 50 meters should be observed. As a practical rule, the spacing should be about 5 meters to 10 meters.

The rings are, for example, made of an acrylonitrilebutadiene rubber or of a thermoplastic rubber. Depending upon the expected operating temperature, it may be advisable to use a cross-linked, rubber-elastic material. Since these rings may also be used as conductors, carbon black or graphite may be added. In lieu thereof, they may be coated with an electrically conductive material. In either case, additional conduction is provided for between layer 4 and barrier shield 5.

Usually, rings 9 may have solid round cross-sections. However, the distances involved in radial direction may be too large so that a hollow profile is more suitable. The hollow space is available here as a store for additives and supplemental materials such as a fire retardent and/or fire extinguishing substances. One may also add here voltage-stabilizing substances which will diffuse in time through the outer core layer 4 and into insulation 3. Other properties will be discussed below.

The cable is made as shown schematically in FIG. 3. It is assumed that a core 10 (consisting of stranded wires, the smoothing layer, the insulation, and shield jacket 4) has already been made and has been wound onto a drum 11 for storage, transportation, etc. This core is now reeled off the drum and passed through a tube 12, serving as storage for rings 9. Tube 12 is sufficiently long and has a trumpetshaped entrance to avoid scraping of the core when inserted and passing through. The rings are placed on the core 10 as it leaves the tube, one ring at a time, and at a particular spacing from one ring to the next one. The rings may be manually or automatically placed into position. The rings are, of course, rather tightly stretched when seated on tube 12. It may be advisable to reduce the diameter of tube 12 towards its ring strip-off end in order to facilitate placement of the rings onto core 10.

A spool or drum 13 is provided as a store for a strip, made, e.g., of copper, aluminum, or an unmagnetic steel. Withdrawal rollers 14 direct the strip into a folding and shaping tool 15, into which core 10 is fed likewise. Accordingly, a split tube, i.e., a tube with abutting or overlapping edges, is formed around core 10, carrying the rings 9.

The tube is seam-welded in a welding station 19 and is gas-tightly closed therewith. It should be noted that the inner diameter of this tube is larger than the outer diameter of the rings, 9. The core with rings 9 will have the natural tendency to sit on and run along the lowest portion of the tube as formed and moved so that the welding from above will not damage these rings.

Next, tube 5 is fed through an annular drawing die 16 to size the tube and reduce its diameter, almost to the dimensions of the rings. Next, the tube is passed through a corrugating station 17 to impart thereto parallel corrugations. It is inherent that rings 9 will escape longitudinally into the nearest corrugation groove unless they sit too tight.

In view of this corrugating process, forcing the metal of the tube radially inwardly, the rings 9 must have a particular strength and hardness. The corrugation tool does not "know" exactly where a ring is located underneath. Thus, the rings should have a shore hardness of 40 to 80, preferably about 60 to 70.

Also, the positioning of rings 9 in grooves 8 makes it desirable to cover the surface of the rings with a lubricant such as oil, e.g., silicone oil. The lubricant may well act as voltage-stabilizing agent or it may contain voltage-stabilizing additives which will later diffuse into insulator 3.

On the other hand, the rings must not be capable of freely sliding on the core because they must not be shifted by the tube-forming process in station 15. For this reason, the rings should have an approximately 10-percent smaller diameter than core 10, still to be stretched when placed on the core. By this feature, one does avoid also that the rings are obliquely distorted by operation of the relative movement between the metal strip and the core.

The final station includes a set of sizing rolls 18 to make sure that rings 9 positively engage the bottoms of their respective corrugation grooves 8 as well as the outer layer on core 10. These grooves, in particular, are, so to speak, indented or flattened, resulting in a cross-sectional deformation of rings 9 by 5% to 20%, 10% to 12% being preferred. Aside from the flattening, as provided by rolls 8, one obtains a smoother outer surface of tube 5.

It should be noted that the corrugation process and the subsequent sizing process urges the corrugated tube, i.e., the inwardly directed ridges 7 thereof into contact with the outer conductive layer 4 of core 10. This force ensures good conductive connection between layer 4 and shield 5. As described above, the rings 9 may well be provided with conductive properties, at least on their surfaces, to provide for additional electrical connections between layer 4 and the metal of the shield.

One may include in the tube, on a running basis, and indicator strip which discolors on contact with moisture. In case of cable failure, this tape or strip can be used to determine whether or not the failure was, in fact, due to ingress of water.

The method of making the assembly as described does assume the use of a store, on which individual sealing rings 9 have been placed. Instead, one may use a hose of rubber-elastic material, being slipped onto storing tube 12, and to cut rings from that hose in steps and commensurate with the placing of such rings onto core 10.

The core as originally made may not necessarily be completely round. It may be advisable in these cases to size the core in one or several stages to obtain a true round cross section without ovality.

Turning now to FIG. 4, conductor 20 in this example is also comprised of many stranded wires, leads, or filaments, covered by a conductive smoothing layer 21. An insulation jacket 22 is provided, being of the same type of material as jacket 3 in FIGS. 1 and 2. This jacket is also covered by a conductive layer 23, being made of a polymer to which, e.g., carbon black or graphite has been added.

Thus far, the assembly resembles core 10 in FIG. 3, but layer 23 is additionally provided with longitudinal ridges 24. By and large, these ridges extend for significant lengths, but are interrupted by gaps 26. Rubber-elastic rings 25 (similar to rings 9, supra) are also provided here, but they are placed specifically into these gaps 26. The gaps 26 are, for example, one centimeter long. The gaps must be sufficiently long so that the rings, 25, can slide axially a little bit, to be sure to lodge in a groove of the corrugations in an outer metal jacket 27. As an approximative rule, the gaps should be about three times as long as rings 25 are thick. The ridges will positively prevent the rings from being shifted axially during the folding process of a strip to form tube 27. The ridges serve as stops for limiting axial displacement of the rings to a range sufficient to ensure that a ring will always lodge in a corrugation groove. The tubular jacket 27 is made as shown in FIG. 3, under utilization of copper, aluminium, or unmagnetic steel strip.

Tube 27 is covered by a bituminous layer 28 which, in turn, carries a polyvinylchloride jacket 29. Broadly, the shield and barrier tube 27 is to be covered by a protective layer with a corrosion-proofing material underneath. PVC and bitumen are respectively the most practical material.

The corrugation process for tube 27 requires that the resulting smallest diameter of the inwardly directed ridge is still a little larger than the largest possible diameter of the insulation envelope. The latter diameter may vary on account of variations in the envelope-forming process. Ridges 24 improve the seating of the corrugated tube, as its inwardly protruding corrugations 7 will indent ridges 24 and, thereby, provide for a positive engagement therewith. Also, contact-making as well as heat transfer is improved.

The ridges 24 are made on and as part of coating 23 by means of extrusion, using particular nozzles to extrude these ridges individually. Gaps 26 can be formed by interrupting the ridge-forming flow of the extrudate for a short period. Alternatively, continuous ridges are formed, and gaps 26 are later cut by removing the requisite portions of the ridge. One may use a suitable cutter, milling tool, peeler, or scraper, or the like.

An alternative mode of providing stops on layer 23 is shown in FIG. 4a. This figure shows layer 23 to be covered by bands 44. Two spaced bands form a small annular trough between them in which lodges a ring 25. The bands may be made of self-adhering or self-welding plastic ribbon, e.g., a polyethylene ribbon or a mixed ethylene polymer. One or more loops may be provided to build the bands up, but their radial dimension (thickness) will remain well below the thickness of the rings, 25. The bands must be just sufficiently high to stop axial displacement of the rings, particularly during the process of forming the metal tube around the core.

The bands are formed intermittently, at the desired spacing for the rings, 25. As stated, two bands per ring 25 to be held is preferred, but one band may suffice as the rings will have a predominant direction of displacement, the displacement tendency, as stated, results primarily from the metal strip folding. The bands are produced by winding a ribbon in several loops around the core. Preferably, one will heat the bands in situ to ensure bonding and welding, i.e., fusion to the substrate. There should be no voids. Timing of placement of the bands is only restricted by the requirement that the metal tube must not have been made as yet. On the other hand, the bands may be made as part of the core making (core 10, FIG. 3). Particularly, they may be made when the substrate is still hot and soft from extrusion. This way, the band will be fused to the substrate.

FIG. 5 illustrates another example of the invention. Conductor 30, layer 31, insulation 32, and conductive layer 33 resemble the corresponding assembly in the cables of FIGS. 1, 2, and 4, except that conductive layer 33 does not have any ridges.

A rubber-elastic spacer ribbon 34, made of EPDM and having, e.g., a thickness of 4 mm, is helically wrapped around jacket 33 to serve as spacer for a concentric, corrugated tube 35. This tube is likewise corrugated; but in this example, tube 35 may have a helical rather than an annular corrugation pattern, though closed-loop corrugation is also feasible. Foam 36 is interposed between ribbon 34 and layer 33 on one hand and tube 35 on the other hand. This foam serves as a sealer against longitudinal migration of moisture. The foam may include voltage-stabilizing additives which diffuse into insulation 32, particularly when the cable heats up during operation. Details will be discussed below.

As far as sealing is concerned, any cross section transverse to the cable axis, such as shown in FIG. 5a, exhibits the following configuration. A portion (segment) of foam 36 seals that gap portion between tube 35 and layer 33 as to migration of moisture transverse to the plane of the drawing. Another segment is sealed by intimate contact between ribbon 34 and a portion of an inwardly directed corrugation ridge. The remainder of that space is sealed by foam between ribbon 34 and tube 35. Thus, complete annular sealing is provided against longitudinal migration of water.

The metal tube 35 is clad in a jacket 37, made of PVC or the like. A bituminous layer may be interposed as described above and shown in FIG. 4.

The ribbon 34 should, generally, be of a rubber-elastic material which preferably has been made electrically conductive, to a conduction of at least $10^{-4}$ ohms$^{-1}$ cm$^{-1}$. The helical contour of this ribbon has the following effect. Take again the cross-section plane through the cable, as shown in FIG. 5a; ribbon 34 will never support core 30 to 33 from all (radial) sides. To state it differently, in the assumed cross-section, there is always a portion of exposed core layer 33 on which inwardly projecting corrugation ridges of the metal tube 35 do not rest; they always rest on the radially elevated surface of spacer ribbon 34. Thus, the insulation is free to thermally expand into the space not occupied by ribbon material and not occupied by tube corrugations. The insulation is never forced against the metal cover 35 from all sides. Thus, even for high temperatures as they occur on short circuit current, the insulation can still "breathe" without damaging metal tube 35. The foam 36 is sufficiently compliant to prevent any transfer of forces.

The electrical conductivity of the ribbon ensures that layer 33 is always in good, conductive connection to metal tube 35. Since ribbon 34 is to be elastic, the corrugation grooves of the tube may well be forced a little into the ribbon and that, in turn, ensures good, electric contact. The contact is maintained during thermal expansion and contraction. Moreover, insulating foam 36 will not creep in between the engaging surface portions of ribbon 34 and the inwardly directed corrugation ridges.

As stated, a 4-mm ribbon thickness is preferred. Ribbon 34 should be at least 1 mm thick, preferably between 1.5 mm and 4.5 mm. The pitch should be long (much longer than any helical corrugation). Layer 33 may include, or be provided with, a cushioning layer. A uniform thickness here is not too critical as the elasticity of the ribbon takes up variations and distributes any local compression as a layer-areal pressure force to be exerted broadly only upon core layer 33, etc., underneath, with no local concentration of applied forces.

Examples for the base material of the ribbon will be given below. Generally speaking, ethylene, propylene rubber (EPDM), or chlorinated polyethylene (CM) is preferred. These materials retain elasticity with age, show little fatigue, and they exhibit a high elasticity even if substantial quantities of a conductive material, carbon black, or graphite, or a blend of both, is added (more additive than rubber base). For practicing the invention, no particular limitation is envisioned as to cross-linking and vulcanization techniques; one will use the most economical and suitable of the techniques for the particular material. Preferably, one cross-links, i.e. vulcanizes, the EPDM on a peroxide basis, by means of steam (CV-method). Alternatively, one may graft organo silane onto the elastomer molecules and cross-link in steam without particular pressure(siloxane cross-linking). The same applies if chlorinated polyethylene is used.

The cable is made in that at first wires or filaments are stranded, covered by the smoothing layer 31 which is applied by extrusion. This is followed by sequentially extruding insulation 32 and conductive layer 33. Thereafter, ribbon 34 is wound around the core as made. The metal tube 35 is formed as was explained with reference to FIG. 3, tube 5. However, prior to closing the split tube, foaming material is fed into the ring space between the core and the not yet corrugated tube. The dwell time, i.e., the delay in the onset of foaming, is selected so that foaming will fully develop only after the tube has been corrugated. The outer jacket, possibly also a bituminous corrosion-proofing layer, are subsequently applied (extruded, etc.).

The foaming process must be rather accurately controlled, particularly in order to make sure that the rather narrow gap between the tube's corrugation and layer 33 underneath will still be filled with foam. On the other hand, the dwell or potting time must be sufficiently long to defer foaming until completion of welding. These are opposing constraints and, thus, require very accurate metering of the foaming agents. This metering involves in particular the inhibiting of the isocyanatepolyol reaction.

The foaming system should, therefore, have the following characteristics:

Pot time (onset of foaming), 35 seconds after insertion of the components. After 180 seconds, the foam is to have risen to half of its full height. Curing time is to be 280 seconds, and rising is to be completed within 300 seconds. After 600 seconds, the foam is to be no longer tacky or sticky.

This system can be accomplished with a ratio of 2:1 of a blend consisting of polyol, foaming or blowing agent, catalyst and foam stabilizer (component A), and of an isocyanate (component B), resulting in an apparent density of the foam of 60 kg/m$^3$ (measured under conditions without constraining boundaries); the density is much higher in the available space.

Foam 36 seals particularly the space between the loops of ribbon 34, as well as the inside of the grooves (outwardly oriented corrugation ridges) of tube 35. The foam is preferably a semirigid, predominantly closed pore foam on a polyurethane basis, with an apparent density of from 100 kg/m$^3$ to 300 kg/m$^3$, preferably 150 kg/m$^3$ to 250 kg/m$^3$, due to the fact that foaming occurs in a confined space and the foam is, thus, compressed. Moreover, the compression makes sure that the pores and cells are predominantly closed; the foam does, indeed, act as a barrier against migration of moisture.

Inspection of a completed cable has revealed that the space between core and tube 35 was, indeed, completely filled with foam. Adhesion to the metal tube as well as to the extruded conductive layer 33 was adequate. Upon bending the cable, the foam did not crack.

The following examples were found to be well suited for practicing the invention.

EXAMPLE I

Component A. A blend of polyol, blowing or driving agent (water) catalyst and foam stabilizers.

Component B. Diphenylmethane-diisocyanate.

The polyol is a reaction product of ethylene oxide with trimethylol propane. Suitable catalysts are tertiary amines, such as dimethylethanolamine, triethylamine, triathylendiamine or diazobicylo-octane. Polysiloxane is a well suited foam stabilizer.

EXAMPLE II

Component A. This component has the same basic type of ingredients as given in Example I, but the polyol is the reaction product of ethyleneoxide with glycerin and propyleneoxide with trimethylol-propane or ethylendiamine. The blowing agent is also water, but mixed with low-boiling point additives such as monofluorotrichlormethane. As a catalyst, one will use here also tertiary amines, as stated in Example I, but combined with primary metal salts such as dibutyltindilaurate or tin-dioctoate.

The foam stabilizer and Component B are the same as in Example I.

The foams resulting from reaction between Components A and B have in either example a density of 60 kg/m$^3$ when foaming without constraint. The pores would then be predominantly open. However (as stated), the space between tube 35 and core 33,34 is a severely limited space and the foam will be compressed, to the three- or four-fold density value (150 kg/m$^3$ and higher). Also, the content of closed pores and cells is significantly higher, more than 50 percent of the total pore volume, up to about 80 percent.

The following examples are compositions for ribbon 34; the components are stated in parts by weight.

Example 1

EPDM—100 parts; Carbon black—Vulcan P—90 parts; Carbon black, Ketjen-black EC—BET, surface >900 m$^2$/g—20 parts; Plasticizer—70 parts; Working aids—10 parts; Age protection—2 parts; Peroxide—7 parts. The ribbon was cross-linked in a CV apparatus and had a breaking strength of 9N/mm$^2$, and rupture limit of 350% extension as well as a specific resistance of 20 $\Omega$cm.

Example 2

EPDM—100 parts; Ketjen-black—45 parts; Graphite—120 parts; Working aids—6 parts; Plasticizer—60 parts; Age protection—2 parts; Peroxide—7 parts. The ribbon was also vulcanized in a CV apparatus, had a tear strength of 6N/mm$^2$ a rupture limit of 100% extension, and a specific resistance of 5 $\Omega$cm.

Example 3

EPDM—100 parts; Graphite—125 parts; Plasticizer—20 parts; Working aid—4 parts; Age protection—2 parts. The ribbon was cross-linked by exposure to moisture, without application of pressure (siloxane cross-linking). The ribbon had a breaking strength of 6N/mm$^2$, an extension limit of 200%, and a specific resistance of 100 $\Omega$cm.

Example 4

Chlorinated polyethylene—100 parts; Ketjen-black EC—30 parts; Plasticizer—30 parts; Working aid—20 parts; Stabilizer—8 parts; Peroxide—7 parts. The ribbon was cross-linked in a CV apparatus and had a breaking strength of 16N/mm$^2$, an extension limit of 450%, and a specific resistance of 15 $\Omega$cm.

The invention is not limited to the embodiments described above; but all changes and modifications thereof, not constituting departures from the spirit and scope of the invention, are intended to be included. This includes particularly multiple conductors being insulated from each other but encased in a common insulation jacket surrounded by a single conductive layer. On the other hand, cables of the illustrated type could be bundled into larger multi-phase cable systems.

We claim:

1. Power cable, particularly for high voltages and including at least one conductor; an insulation envelope surrounding the conductor; and a conductive layer on the envelope, surrounding the envelope completely in intimate contact therewith, the improvement of an assembly on the conductive layer comprising:

a corrugated metal tube surrounding the conductive layer corrugations of the tube looping around the circumference of said conductive layer in order to provide radial resiliency for taking up any thermal expansion of the conductor and envelope underneath; and individual rubber-elastic rings respectively disposed in spaces between the metal tube and the conductive layer and forming annularly completely closed seals along the cable, the rings being resiliently urged against the conductive layer by corrugation of the metal tube.

2. Cable as in claim 1, the corrugation having annular grooves and ridges, the ridges engaging the conductive layer, some of the grooves containing the rings.

3. Cable as in claim 2, said rings being made of an acrylonitrilebutadiene rubber, having at least one conductive additive.

4. Cable as in claim 2 or 3, said rings having a shore hardness of from 40 to 80.

5. Cable as in claim 4, a preferred range for said shore hardness being 60 to 70.

6. Cable as in claim 2, including means for limiting axial displacement of said rings.

7. Cable as in claim 6, the means for limiting being axially extending ridges of the conductive layer.

8. Cable as in claim 6, the means for limiting being bands fused to the conductive layer.

9. The method of making a cable, comprising providing a core which includes a conductor with an insulating jacket and a conductive layer thereon;

placing individual rings of a rubber-elastic material on the core;

folding a metal strip around the core and closing it to obtain a tube;

corrugating the tube so that the rings lodge in individual grooves which loop around the core; and urging the grooves radially inwardly to compress the rings while ridges of the corrugation are urged in intimate contact with the conductive layer.

10. Method as in claim 9, including the step of drawing the tube prior to corrugation to reduce its diameter.

11. Method as in claim 9, wherein the urging step includes the step of cross sectionally deforming the rings by 5% and 20%.

12. Method as in claim 9, the placing step including passing the core through a tube holding the rings, and stripping the rings off the tube onto the core.

* * * * *